Oct. 19, 1948.     G. A. CHOTT     2,451,918
DENTAL POLISHING CUP
Filed April 6, 1944

Inventor
George A. Chott
by Joshua R. H. Potts
his Attorney.

Patented Oct. 19, 1948

2,451,918

UNITED STATES PATENT OFFICE 2,451,918

DENTAL POLISHING CUP

George A. Chott, Riverside, Ill., assignor of one-half to Hugo J. Chott, Riverside, Ill.

Application April 6, 1944, Serial No. 529,796

1 Claim. (Cl. 32—59)

This invention relates to dental tools or instruments and method of making or producing the same, and more particularly to what is known as a dental polishing cup which embodies a shank having one end adapted to fit the handpiece of the dentist's instrument or engine, and the other end of which carries a rubber cup adapted to be dipped into and hold a quantity of dentrifice or tooth powder and which is held against the teeth, especially while driven or rotated at high speed in cleaning and polishing the teeth, and is a continuation in part of my abandoned prior application, Serial No. 469,338, filed December 17, 1942, for Dental polishing cup, which was a division of my prior application, Serial No. 461,929, Patent No. 2,393,751, filed October 14, 1942, for Dental polishing tool and method of making same.

Heretofore, as shown in the patents to Edward L. Chott, Nos. 1,644,465, of October 4, 1927, and 2,093,006, of September 14, 1937, it was common to mount the cup on the shank by providing a central bore in one end thereof and splitting the tubular portion thus produced to form tongues, some of which were bent back, usually alternate ones, to form an anchoring means for the elastic or soft rubber cup which was mounted and compressed in a crude state about said end and shaped so as to form a cavity or cup in the end remote from the body thereof and then vulcanized at the proper temperature and for the required time necessary to leave the rubber soft and elastic, so as to conform to the teeth, cavities and interstices.

However, the molding of the soft rubber cup directly on to one end of the polished metal of the shank, even though held by the embedded tongues, failed to produce a firm connection sufficient to prevent the cup from becoming loose during use, owing to the centrifugal force resulting from the high speed at which the instrument is rotated and uneven pressure applied to different portions of the cup.

Moreover, when the crude rubber was formed, molded and compressed around the shank and then subjected to heat in the vulcanizing process, a portion of the rubber would flow down over the shank disposed thereabeneath in a bore provided for the shank in a vulcanizing mold, and form a thin sheath of rubber around the shank between the same and the mold; while, owing to the necessity of accurate fit of the shank and the snug fitting thereof in the socket, clamp or bitstock of the handpiece, it was necessary to remove this surplus rubber vulcanized around the shank before use and removal thereof sometimes resulted in loosening of the cup at the base so as to render the same useless.

It is, therefore, an object of the present invention to overcome the above objections and difficulties by so mounting and securing the cup to the shank in the vulcanizing process that the cup will be firmly and positively fastened or securely anchored in position while being used and held, even while cleansing and polishing the teeth. A further object of the invention is to provide a device of the character stated which shall be of such construction that the flow of surplus rubber, fused by the heat of vulcanization, down over the shank will be effectively prevented and removal thereof rendered unnecessary.

Other objects will appear hereinafter.

With these objects in view, my invention consists generally in novel means for anchoring a soft rubber dental cup to its shank, said means comprising a ring of harder material than the cup and fitted snugly over the shank adjacent one end thereof; means on the shank engaging said ring to prevent expansion of the same, and the cup vulcanized to the ring and adjacent portion of the shank; so that the abutting areas of the ring and cup are fused together during vulcanization.

My invention further consists in a device as above-mentioned, in which the ring, after the vulcanization, remains harder than the cup, so as to cooperate with the tongues to prevent expansion or stretching.

More specifically, my invention contemplates having certain of the tongues bent over and engaging the outer periphery of the ring.

My invention further consists in having the ring above-mentioned, arranged on the shank in such a position as to prevent the rubber during vulcanization from seeping into the space between the shank and the wall of the bore of the mold.

My invention will be more readily understood by reference to the accompanying drawings, in which—

Figure 1:
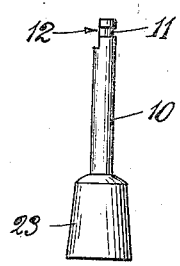
Fig. 1 is a side elevation of a dental tool or instrument made in accordance with the invention.

Referring more particularly to the drawings in detail, the dental tool or instrument forming a teeth cleaning device, sometimes known as a polishing cup, consists of a shank 10 of polished or nickeled metal, usually of brass or bronze, or other suitable tough malleable metal, such as German silver, having at one end thereof a groove 11 by which the shank may be held in the handpiece, clamp or bitstock of a dental instrument, such as an ordinary dental engine at one end of a flexible shaft which is driven at high speed, usually by means of an electric motor.

One side of the shank at the groove 11 has a cutaway or flattened portion 12 by which a coupling is made to the shaft to cause the shank to rotate therewith. The other end of the shank is provided with a central counterbore 13 which forms a relatively thin tubular portion or wall 14, which is split longitudinally at a plurality of points, as indicated at 15, thus forming a plurality of longitudinal tongues, alternate ones of which are bent outwardly and backwardly, as indicated at 16, and the other tongues are bent outwardly in slightly divergent relation, as indicated at 17.

A shoulder or enlargement 18, preferably in the form of a collar, ring or washer of partially vulcanized crude rubber, is then applied to, or slipped on, the shank against the tongues 16 and fitted snugly within the laps formed by said tongues, which forms a seat to effectively limit the displacement of the collar on the shank. This may be done by inserting the grooved end of the shank into the aperture of the collar, and then displacing one relative to the other by means of a suitable template or otherwise, so that the collar will be forced down against the tongues.

These collars or rings may be produced by cutting the same from a partially vulcanized rubber tube of the proper size and bore to fit snugly on the shank with sufficient friction to hold the same in position when once forced against the tongues and vulcanized to firmly adhere and be held to the shanks.

After this, the shanks are held in a suitable mold body 19, having bores 20 for receiving the same and associated matrix-forming cavities 21 at the top, into which the split end of the shanks, that is, the tongues and collar, project.

Figure 2:
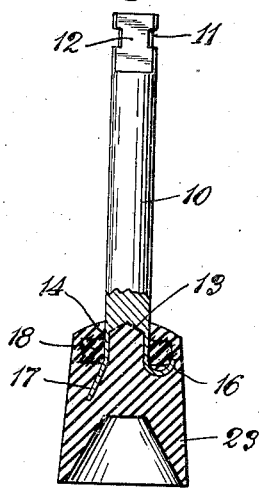
Fig. 2 is an enlarged central longitudinal section thereof.
Figure 6:
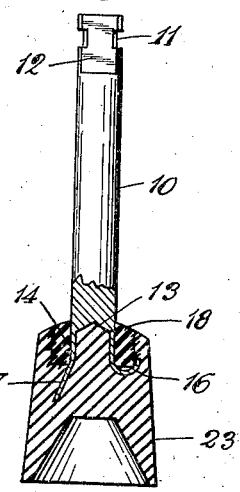
Fig. 6 is a view similar to Fig. 2, illustrating a slightly different form of the device.
Figure 3:
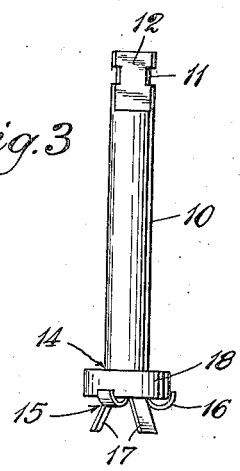
Fig. 3 is a similar view of a shank with a collar or washer thereon prior to the formation of the cup thereover.
Figure 4:
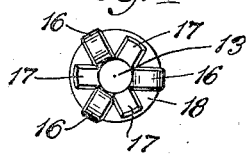
Fig. 4 is an end elevation of the shank as shown in Fig. 3.
Figure 5:
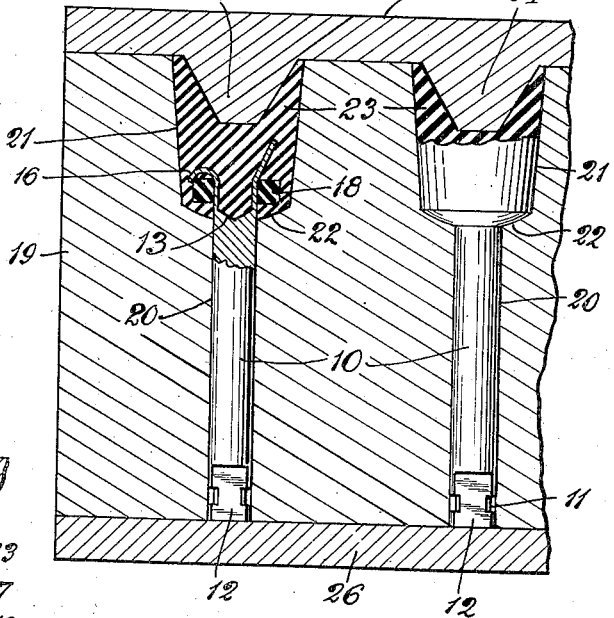
Fig. 5 is a sectional view of a mold showing the manner of forming and vulcanizing the cup.
Figure 7:
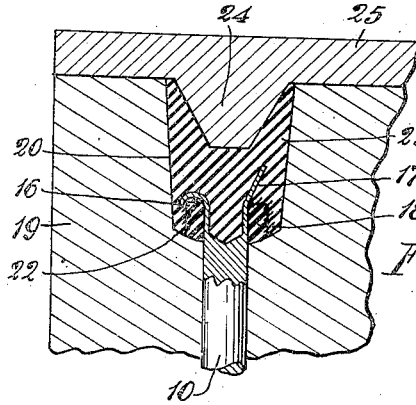
Fig. 7 is a detail view, similar to Fig. 5, and illustrating the manner of molding the form shown in Fig. 6.

The collar may be spaced from the end 22 of the cavity, so that the crude rubber of the cup 23 may enter bore 13 and be molded and compressed around, over and under the tongues and collar and around the shank to provide a thickness of the rubber, or a wall of the same externally of and beneath the collar, as well as radially or peripherally around the same and the tongues as illustrated in Figs. 2 and 5; or, it may be preferable that the collar be of such extent and so located as to abut the bottom 22 of the cavity, and prevent the melted rubber of the cup from flowing into the bores 20 during vulcanization, and adhering to the stem portion of the shank, as illustrated in Figs. 6 and 7.

The cup 23 may be provided with a flared cavity, as by forming bosses 24 on the top member 25 of the mold which is placed on a base plate 26, thus forming the raw or crude rubber combined with sulphur or other material used in vulcanizing, into a cup-shaped contact piece completely around the shank and anchoring parts. In the form shown in Figs. 2 and 5, the collar 18 will be completely covered by the base of the cup; whereas in the other form a face of the ring is exposed.

The mold and crude rubber are then subjected to the required heat for the necessary time duration to properly cure or vulcanize the same, in such a manner as to leave the same elastic and soft and pliable, but tough, compression of the crude rubber in the mold serving to give the required density to the rubber to stand up in use.

The partially cured or vulcanized rubber of the collar and the crude or unvulcanized rubber of the cups as thus compressed, are then subjected to vulcanizing temperature for the required period to cause complete vulcanization necessary to leave the rubber cup elastic or soft and pliable, but tough. This causes the rubber of the collar and the cup to be fused together for a slight depth along what had been their contacting faces so that they will snugly adhere to and be firmly anchored to each other.

As the collar was initially vulcanized, it will be further vulcanized during the process and maintain a hardness somewhat greater than that of the cup, and, therefore, be firmly held by the tongues 16 and prevented from expanding from the stresses produced by the centrifugal force and the uneven pressure applied to the periphery of the cup when in use.

When the device is used, the cup is dipped into and holds a quantity of dentrifice or tooth powder, especially by reason of the serrated inner surface of a cup, and is held against the teeth especially while driven at high speed in cleansing and polishing.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to secure by Letters Patent is:

In a dental polishing tool, a shank having a bore at one end forming a tubular portion split longitudinally to form tongues, certain of the tongues being bent ack on themselves in curved formation substantially normal to the axis of the shank and the other tongues bent outwardly in slightly divergent relation, a partially cured rubber collar on the shank against the first-named tongues with the ends of the tongues engaging the periphery of the collar, and a soft rubber cup having a body portion vulcanized over the tongues and fused with the collar to envelope the same.

GEORGE A. CHOTT.

REFERENCES CITED

The following references are of record in the file of this patent:

UNITED STATES PATENTS

| Number | Name | Date |
|---|---|---|
| 425,897 | Morrison | Apr. 15, 1890 |
| 1,644,465 | Chott | Oct. 4, 1927 |
| 1,837,938 | Young | Dec. 22, 1931 |
| 2,039,278 | Blanchard | May 5, 1936 |
| 2,093,006 | Chott | Sept. 14, 1937 |